Dec. 8, 1953 C. J. H. A. STAAL 2,662,175
MULTIPLEX TRANSMISSION DEVICE
Filed Feb. 18, 1948
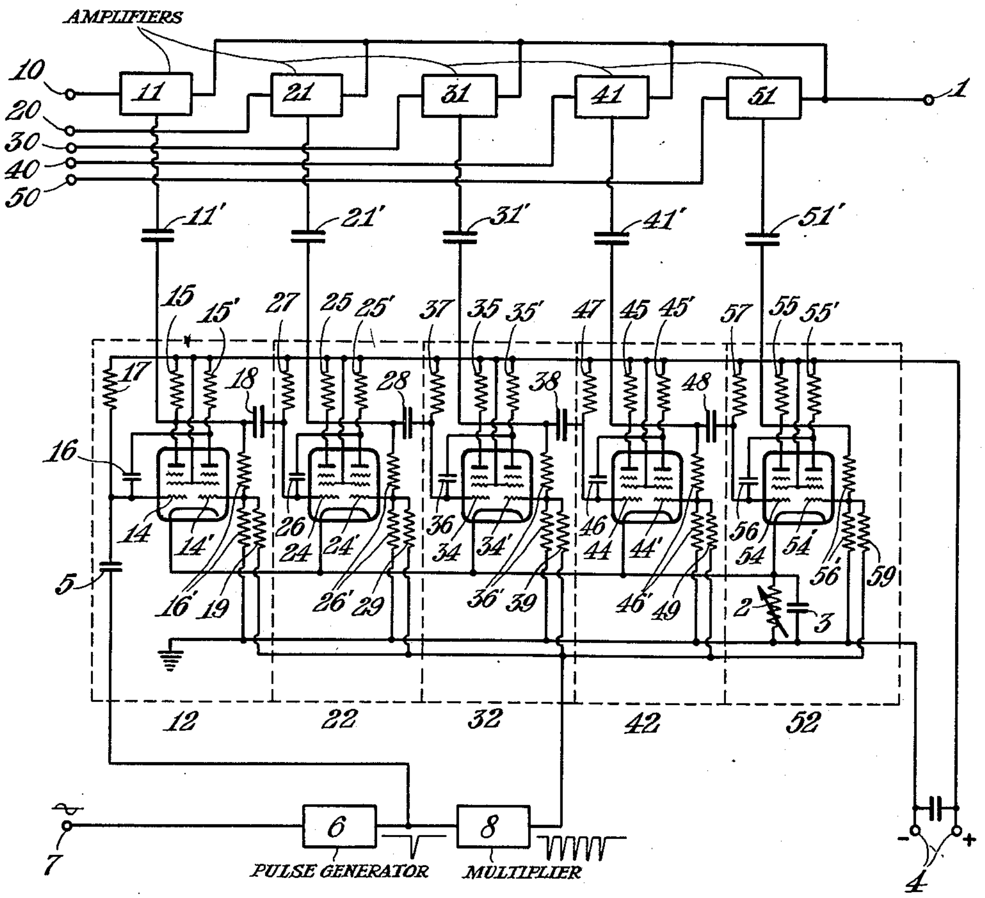
INVENTOR.
CORNELIS J.H.A.STAAL.
BY Fred M Vogel
AGENT.

Patented Dec. 8, 1953

2,662,175

UNITED STATES PATENT OFFICE 2,662,175

MULTIPLEX TRANSMISSION DEVICE

Cornelis Johannes Henricus Antonius Staal, Eindhoven, Netherlands, assignor to Hartford National Bank and Trust Company, Hartford, Conn., as trustee Application February 18, 1948, Serial No. 9,165

Claims priority, application Netherlands March 5, 1947

2 Claims. (Cl. 250—27)

This invention relates to multiplex transmission systems for transmitting and receiving purposes, comprising a plurality of periodically and successively operating transmission channels such, for example, as used for the multiple transmission of a plurality of telephone, telex or other signals. The various signals to be transmitted may be transmitted by amplitude-, phase- or frequency-modulation of a carrier wave or by means of a carrier-wave consisting of pulses which characterise the signals by their phase shift or duration.

It is known to release the channels in such a multiplex arrangement by successive, rectangular deblocking or releasing pulses, which will hereinafter be called (channel) gating pulses.

During every system cycle the transmission channels are once released transiently by various pulses of the series of channel gating pulses coinciding with a cycle period.

These series of gating pulses are used in such a multiplex system both at the transmitter end and at the receiver end and shoulder be accurately synchronized, in connection with which one of the transmission channels is frequently reserved for transmitting one synchronisation pulse per transmission cycle.

For producing these pulse series in multiplex systems by electronic means several methods are known. Use may, for example, be made of a cathode-ray tube in which the end of an electron beam describes a circle and thus strikes successively a plurality of output electrodes arranged along the circumference of a circle. The gating pulses to be fed to the various channels may then be taken from output resistances connected to the corresponding output electrodes.

In practice, however, such cathode-ray tubes are particularly open to objection, notably in conjunction with the required high supply voltage, the complicated construction and the fact that the number of output electrodes cannot be varied in a simple manner or the duration of the pulses obtained cannot be adjusted independently of one another.

The disadvantages inherent to a cathode-ray tube are obviated in a further known method, in which use is made of a symmetrical multivibrator arrangement synchronised by the cycle-synchronisation pulses and of a second symmetrical multivibrator which is synchronised by the former and produces an alternating voltage of double the fundamental frequency. By summation and subtraction and using threshold and limiting devices four successive channel gating pulses can be derived from the harmonic, rectangular voltages thus produced. By adding a third multivibrator, which provides doubling of the fundamental frequency of the alternating voltage produced by the second multivibrator eight ($2^3$) gating pulses are obtainable in an analogous manner, four multivibrators producing $2^4$ gating pulses and so forth.

This so-called "powers of two" system has, however, several other disadvantages. There is a lack of freedom in choosing the number of gating pulses per transmission cycle and, consequently, the number of channels in a multiplex system and in addition an increasing number of multivibrators (four and more) renders the circuit-arrangement very unsurveyable, whilst at the various output resistances there are set up not only the required gating pulses but often also pulses coinciding with the beginning and the end of other gating pulses, which may provoke serious disturbances in multiplex systems. Moreover, the gating pulses of one series are of different durations, since in connection with synchronisation the various multivibrators should exhibit a lower natural frequency than the cycle-frequency or harmonics thereof, which may provoke cross-talk between different multiplex channels.

The invention has for its object to provide a circuit-arrangement for producing, by electronic means, series of successive, rectangular pulses, which is particularly suitable for use in multiplex systems.

According to the invention use is made, in a multiplex transmission arrangement of the said kind, of a gating pulse circuit-arrangement which produces the series of gating pulses by electronic means and comprises a number of pulse generators corresponding to the number of channels of the multiplex arrangement, each of which generators comprises a grid-controlled discharged path which is coupled back in such manner that at the most two stable working points corresponding to extreme anode-current values occur, whilst in each of the series of pulse generators, owing to a control pulse of given polarity supplied to the input control-grid, changing over from one working point to the other occurs, from an anode-current variation which occurs upon return to the initial working point in the first of two arbitrary pulse generators operating in succession there being derived a control pulse of the said given polarity which is supplied to the input control-grid of the second of the two pulse generators.

The back-coupled amplifying system used in each pulse generator may naturally be constructed in very different ways as are known per se for multivibrators (cf. "Electronics," October 1946, pages 136, 138). For example, use may be made of the negative part of the screen-grid current control-grid voltage characteristic curve of a screen-grid tube or of the declining part of the characteristic curve of a secondary-emission tube.

In a thoroughly tested experimental constructive of the multiplex transmission system according to the invention use was made of pulse generators comprising two crosswise coupled pentodes in which, in spite of the great mutual conductances attained no difficulty whatsoever arose with respect to stability and time constants of the circuits, for example, upon replacement of the tubes. With each pulse generator the input control-grid of one pentode is preferably capacitatively coupled with the other pentode, the control-grid of the latter pentode being galvanically coupled with the pentode comprising the input control-grid.

Owing to this capacitative coupling the pulse generator arrangement automatically returns, after the occurrence of a pulse at the input control-grid, to the initial working point after a period which is primarly determined by the coupling condenser and the resistances included in its charging circuit. This duration is controllable by variation of one of these elements for each impulse generator separately and entirely independently of the other pulse generators. Furthermore this duration depends upon the bias operating in the control-grid circuit and upon other supply voltages of the amplifying systems and may consequently be varied by varying a supply voltage common to all pulse generators simultaneously and equally for all pulse generators.

The return of the pulse generators to the initial working point may be effected by means of auxiliary control pulses which are simultaneously supplied to auxiliary control-electrodes of all pulse generators, since with a suitable polarity of the auxiliary control-pulses at the most one of the pulse generators can thus be influenced at any desired moment.

In order that the invention may be more clearly understood and readily carried into effect, it will now be described more fully with reference to the accompanying drawing, given by way of example.

The sole figure represents a multiplex transmission system in which five transmission channels 10, 20, 30, 40, 50 are periodically and alternatively connected to a common output lead 1 with the aid of five amplifiers 11, 21, 31, 41, 51 which are located in the corresponding channels, and are normally blocked and alternately released by gating pulses supplied through condensers 11', 21', 31', 41', 51'.

According to the invention these gating pulses are produced by five essentially identical pulse generators 12, 22, 32, 42, 52.

Each of the pulse generators comprises two pentode systems 14, 14'; 24, 24'; 34, 34'; 44, 44'; 54, 54' respectively which are incorporated in a single tube and have common cathodes and separate anode resistances 15, 15'; 25, 25'; 35, 35'; 45, 45'; 55, 55'. Associated pentodes are crosswise coupled i. e. the input control-grids constituted by the control-grids of the pentodes 14, 24, 34, 44, 54 of the pulse generators are coupled by condensers 16, 26, 36, 46, 56 respectively to the anodes of the second pentodes 14', 24', 34', 44', 54', the control-grids of the latter pentodes being connected to potentiometers 16', 26', 36', 46', 56' respectively located in every instance between the anode of the first pentode and earth. Successive pulse generators are intercoupled by coupling condensers 18, 28, 38 and 48.

In the control-grid circuits of all pentodes a negative bias is operative which is produced by a common cathode resistance 2 with parallel condenser 3 and is sufficiently high in itself to block all pentode systems. For the first pentodes 14, 24, 34, 44, 54 of the pulse generators this negative bias voltage is, however, neutralized by a much higher positive bias which is obtained by connecting the input control-grids through resistances 17, 27, 37, 47, 57 to the positive anode-voltage terminal 4 and brings about that the first pentodes carry current in their position of rest. The potentiometers 16', 26', 36', 46', 56' are so chosen as to block, in the position of rest, the control grids of the second pentodes 14', 24', 34', 44', 54', in spite of the positive bias voltage set up at earthed resistances of the potentiometers and counteracting the negative bias set up at the cathode resistance 2.

If, starting from the aforesaid position of rest, a cycle synchronisation pulse of negative polarity is supplied to the input control-grid of the first pulse generator 12, for example through a coupling condenser 5, the anode current of the first pentode 14 decreases and the potential of the anode increases which, owing to the potentiometer 16' causes the second pentode 14' to be deblocked. The anode current thus produced in the second pentode provokes a decrease in potential of the anode of this pentode. This potential decrease is transmitted through the condenser 16 to the input control-grid and supports the action of the negative voltage pusle supplied thereto. The cumulative effect described brings about, as is known per se, abrupt blocking of the first pentode 14 and simultaneous deblocking of the second pentode 14'. The rate of this "flipping over" and consequently the flank steepness of the current pulse occurring increase according as the mutual conductance of the amplification system used is higher.

On flipping over the potential increase of the anode of the first pentode 14 of the pulse generator 12 is supplied through a coupling condenser 18 to the input control-grid of the second pulse generator 22. The voltage pulse thus set up at the input control-grid of the second pulse generator 22 exhibits a positive polarity and does not affect the pentode 24 which then carries current.

In the circuit-arrangement described an automatic "flipping back" of the pulse generator into the position of rest occurs after a time primarily determined by the charging time constant of the condenser 16 (resistances 15' and 17), i. e. when the potential of the input control-grid has increased, by charging the condenser 16, to such a degree that the first pentode 14 begins to draw current and this, owing to the galvanic coupling 16', entails a decrease in anode current of the second pentode 14'. As an alternative this "flipping back" may be initiated previously by a pulse of negative polarity applied to the control-grid of the second pentode 14' (a positive voltage pulse would not have any effect).

During the blocking time of the first pentode a positive voltage pulse occurs at the anode thereof which pulse constitutes the first of a series of channel gating pulses and is supplied, through the coupling condenser 11' to the first channel amplifier 11 for deblocking.

Upon the first pulse generator 12 flipping back into its position of rest, a negative voltage pulse is fed through the coupling condenser 18, to the input control-grid of the second pulse generator 22, and urges, in the manner explicity described in regard to the first pulse-generator, the second pulse generator out of its position of rest. After a time primarily determined by the values of the back-coupling condenser 26 and the resistances 25′ and 27 or due to a voltage pulse of negative polarity supplied to the control grid of the second pentode 24′ the second pulse generator flips back again into its position of rest and then starts, through the coupling condenser 28, the third pulse generator and so forth, until the last pulse generator 52 also produces a channel gating pulse and resumes its position of rest. Then the initial state existing prior to the supply of the cycle synchronisation pulse to the input control-grid of the first pulse generator 12 is again attained.

During this cycle, which is, for example, initiated by the cycle synchronisation pulse, the pulse generators starting each other in succession produce gating pulses which perform, through the coupling condensers 11′, 21′, 31′, 41′, 51′, deblocking of the channel amplifiers 11, 21, 31, 41, 51 successively in the rhythm of the so-called switching frequency.

Since the duration of the gating pulses depends upon the negative grid bias supplied to the pentodes, variation of the cathode resistance 2 permits the duration of all channel gating pulses to be influenced simultaneously and equally. In addition, it is possible to achieve a variation of the duration of the gating pulses by variation of any of the other supply voltages of the pulse generators. An undue variation of the duration of the gating pulses, owing to variations of any of the supply voltages, should be prevented in the arrangement described by stabilisation of the anode voltage.

In the multiplex transmission system described the cycle-synchronisation pulse is taken from a pulse generator 6 which is controlled by a voltage (7), for example sinusoidal of cycle frequency. These voltage pulses are supplied not only to the first pulse generator 12 through the coupling condenser 5, but also as synchronisation pulses to a self-oscillating pulse generator 8 which furnishes a fivefold pulse-repeater frequency and of which the output pulses of repeater frequency corresponding to the switching frequency are supplied in parallel-connection, through resistances 19, 29, 39, 49, 59, to all control-grids of the second pentodes of the pulse generators. These pulses determined the instant at which a pulse generator removed from its position of rest, resumes its position of rest. If these pulses have a negative polarity they are effective only, through being simultaneously applied to all pulse generators, with the pulse generator which is not in its state of rest.

In the form of construction, shown by way of example, the cruciform couplings are of a different nature, which is not absolutely necessary. For example, the two couplings may be galvanical; in this case the pulse generators do not resume automatically their state of rest, which should be effected by auxiliary control pulses.

As an alternative the nature of the two couplings may be capacitative or inductive, or again they may be a combination of the various possibilities.

A further alternative of the circuit-arrangement described consists in a construction of the pulse generators such that in the state of rest the first pentodes of the pulse generators are blocked and the second pentodes carry current. In this case all control pulses applied to the pulse generators should have a positive polarity. In this event gating pulses of positive polarity can be obtained from the anode resistances of the second pentodes of the pulse generators.

In an experimental construction of the circuit-arrangement according to the invention for multiplex receivers it has been found that the pulse generators, in the case of the supply voltage being stabilised, exhibit a very great stability, even if the flipping back of the pulse generators into the state of rest is effected automatically. It has been found that by employing the customary, series-manufactured circuit elements it is possible to adjust the time constants in such manner that the duration of a series of gating pulses exactly corresponds to the time interval between successive cycle-synchronisation pulses (repeater frequency for example 10 kc./s.) and that this duration is maintained accurately with a tolerance of 0.2%, despite prolonged and considerable temperature and humidity variations of the surroundings.

What I claim is:

1. In a multiplex transmission system provided with a plurality of transmission channels sequentially and periodically rendered operative by rectangular gating pulses applied to each channel, apparatus for producing said gating pulses comprising a like plurality rectangular-pulse generators each constituted by first and second electron discharge tubes having a cathode, a grid and an anode, the cathodes of said tubes being interconnected, the grid of the first tube being capacitively coupled to the anode of the second tube and the grid of the second tube being directly coupled to the anode of the first tube to define an unbalanced trigger circuit normally remaining in one equilibrium state and reverting to said state after a predetermined interval when triggered by a pulse applied to the grid of the first tube into another equilibrium state, a common cathode bias resistor connected to the interconnected cathodes in all of said generators, means coupling the anode of the first tube in each of said generators to the grid of the first tube in the succeeding generator to provide a cascade arrangement in which each succeeding generator is triggered at the trailing edge of the rectangular-pulse yielded in the preceding generator, means to apply triggering pulses periodically to the grid of the first tube of the first said generators in the cascade whereby for each of said pulses said generators are triggered in sequence, and means to apply the rectangular pulses produced in each generator to a respective channel to render same operative.

2. An arrangement, as set forth in claim 1, wherein said cathode bias resistor is variable.

CORNELIS JOHANNES HENRICUS ANTONIUS STAAL.

References Cited in the file of this patent

UNITED STATES PATENTS

| Number | Name | Date |
|---|---|---|
| 2,272,070 | Reeves | Feb. 3, 1942 |
| 2,443,198 | Sallach | June 15, 1948 |
| 2,444,950 | Nichols et al. | July 13, 1948 |
| 2,471,138 | Bartelink | May 24, 1949 |
| 2,478,920 | Hansell | Aug. 16, 1949 |
| 2,486,491 | Meacham | Nov. 1, 1949 |